US012119575B2

(12) United States Patent
Nishitani et al.

(10) Patent No.: US 12,119,575 B2
(45) Date of Patent: Oct. 15, 2024

(54) CONNECTOR AND CONNECTOR MOUNTING BODY

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Akihiro Nishitani, Mie (JP); Kenji Makino, Mie (JP); Takashi Natsume, Mie (JP); Shunya Takeuchi, Mie (JP); Yutaka Kobayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 432 days.

(21) Appl. No.: 17/605,937

(22) PCT Filed: Apr. 20, 2020

(86) PCT No.: PCT/JP2020/017017
§ 371 (c)(1),
(2) Date: Oct. 22, 2021

(87) PCT Pub. No.: WO2020/230532
PCT Pub. Date: Nov. 19, 2020

(65) Prior Publication Data

US 2022/0216627 A1 Jul. 7, 2022

(30) Foreign Application Priority Data

May 10, 2019 (JP) ................................ 2019-089506

(51) Int. Cl.
*H01R 24/28* (2011.01)
*H01R 12/58* (2011.01)
(Continued)

(52) U.S. Cl.
CPC ........... *H01R 12/58* (2013.01); *H01R 12/716* (2013.01); *H01R 12/77* (2013.01); *H01R 13/502* (2013.01)

(58) Field of Classification Search
CPC ...... H01R 12/58; H01R 12/716; H01R 12/77; H01R 13/502; H01R 13/42; H01R 12/75
See application file for complete search history.

(56) References Cited

U.S. PATENT DOCUMENTS 6,174,197 B1 * 1/2001 Hirata .................. H01R 12/716 439/541.5
2009/0305530 A1 * 12/2009 Ito ........................ H01R 13/447 439/80
(Continued)

FOREIGN PATENT DOCUMENTS

CN 202423650 U 9/2012
JP H03-112082 A 5/1991
(Continued)

OTHER PUBLICATIONS

International Search Report issued on Jun. 16, 2020 for WO 2020/230532 A1 (5 pages).

*Primary Examiner* — Abdullah A Riyami
*Assistant Examiner* — Nelson R. Burgos-Guntin
(74) *Attorney, Agent, or Firm* — Venjuris, P.C.

(57) ABSTRACT

It is aimed to provide a connector and a connector mounting body capable of ensuring good workability at the time of manufacturing and connection reliability with a circuit board. A connector includes a connector housing and a flexible cable arranged in the connector housing and includ-
(Continued)

ing conductive paths. The flexible cable includes terminal connecting portions to be connected to mating terminals on one end sides of the conductive paths and board connecting portions to be connected to a circuit board on the other end sides of the conductive paths. The connector includes a reinforcement plate for reinforcing a region of the flexible cable on the side of the terminal connecting portions.

10 Claims, 9 Drawing Sheets

(51) Int. Cl.

| | |
|---|---|
| ***H01R 12/71*** | (2011.01) |
| ***H01R 12/77*** | (2011.01) |
| ***H01R 13/502*** | (2006.01) |

(56) References Cited

U.S. PATENT DOCUMENTS

| | | | | |
|---|---|---|---|---|
| 2012/0184149 A1* | 7/2012 | Suzuki | .................. | H01R 24/28 439/660 |
| 2012/0184152 A1* | 7/2012 | Kataoka | ................. | H01R 24/28 439/660 |

FOREIGN PATENT DOCUMENTS

| | | | |
|---|---|---|---|
| JP | H10-032062 | A | 2/1998 |
| JP | H10-199637 | A | 7/1998 |
| JP | 2000-277219 | A | 10/2000 |
| JP | 2000-311736 | A | 11/2000 |
| JP | 2013-122885 | A | 6/2013 |
| JP | 2014-165163 | A | 9/2014 |
| JP | 2015-204165 | A | 11/2015 |

* cited by examiner

CONNECTOR AND CONNECTOR MOUNTING BODY

CROSS REFERENCE TO RELATED APPLICATIONS

This application is a national phase of PCT application No. PCT/JP2020/017017, filed on 20 Apr. 2020, which claims priority from Japanese patent application No. 2019-089506, filed on 10 May 2019, all of which are incorporated herein by reference.

Technical Field

The present disclosure relates to a connector and a connector mounting body.

Background

A connector disclosed in Patent Document 1 is a surface mount connector and includes contacts and a housing. The housing is made of synthetic resin and box-shaped and has a bottom surface to be held in contact with a circuit board. The contact is made of metal and tab-shaped and includes a contact portion to be connected to a mating female terminal in one end part and a connecting portion to be connected to the circuit board in the other end part. A tip part of the connecting portion is arranged along a surface of the circuit board and soldered to the circuit board.

A connector disclosed in Patent Document 2 includes contacts, a housing for holding the contacts and a flexible terminal to be interposed between the contacts and a board. The flexible terminal includes an upper end part to be connected to the contacts and a lower end part to be connected to the board. The upper end part includes insertion holes penetrating through the flexible terminal in a stepped manner. The contact is made of metal and pin-shaped and is crimped and connected to the flexible terminal by splitting a forked rear end open while being inserted into the insertion hole.

PRIOR ART DOCUMENT

Patent Document

Patent Document 1: JP 2015-204165 A

Patent Document 2: JP 2014-165163 A

SUMMARY OF THE INVENTION

Problems to be Solved

In Patent Document 1, if heating is applied using a heating device such as a reflow furnace, for example, when the contacts are connected to the circuit board, the circuit board and the housing may receive a heat load and be warped and deformed. Since there is a difference in thermal expansion coefficient between the housing and the circuit board, if the circuit board and the housing are warped and deformed, the housing is partially lifted from the circuit board and the rear end parts of the contacts are separated from the circuit board. Accordingly, in the case of Patent Document 1, it becomes difficult to make such an adjustment that the rear end parts of the respective contacts are located on the same plane, making an operation process cumbersome, and the connection reliability of the contacts and the circuit board is a problem.

In contrast, in the case of Patent Document 2, the shape of the insertion holes are complicated and a crimping operation needs to be performed in connecting the contacts and the flexible terminal after the rear ends of the contacts are processed into a forked shape. Thus, there is a problem that an operation process becomes cumbersome.

Accordingly, it is aimed to provide a connector and a connector mounting body capable of ensuring good workability at the time of manufacturing and connection reliability with a circuit board.

Means to Solve the Problem

The present disclosure is directed to a connector with a connector housing, and a flexible cable arranged in the connector housing, the flexible cable including a conductive path, wherein the flexible cable includes a terminal connecting portion to be connected to a mating terminal on one end side of the conductive path and a board connecting portion to be connected to a circuit board on the other end side of the conductive path, and the connector includes a reinforcement plate for reinforcing a region of the flexible cable on the side of the terminal connecting portion.

Effect of the Invention

According to the present disclosure, it is possible to provide a connector and a connector mounting body capable of ensuring good workability at the time of manufacturing and connection reliability with a circuit board.

DETAILED DESCRIPTION TO EXECUTE THE INVENTION

Description of Embodiments of Present Disclosure

Figure 1:
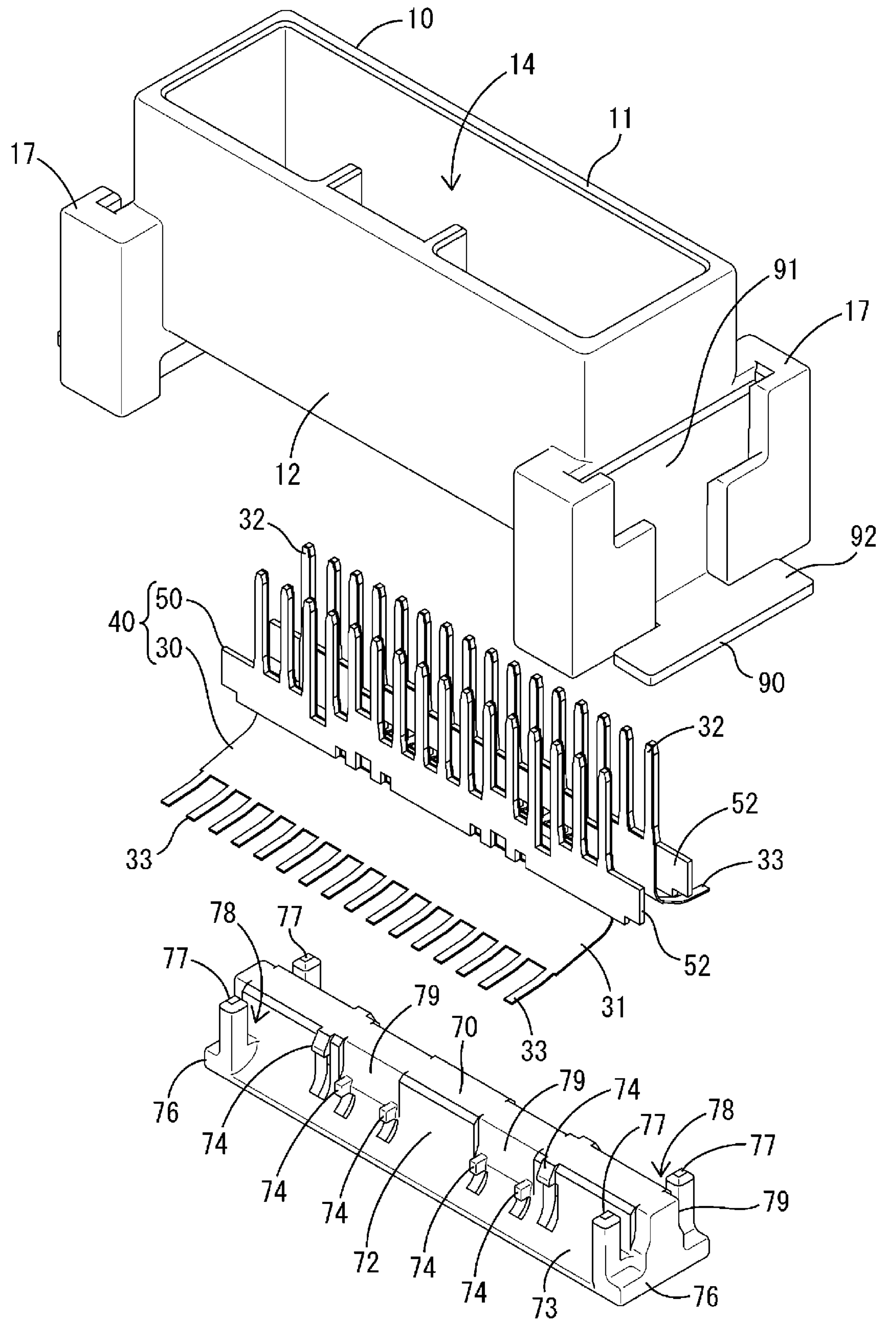
FIG. 1 is an exploded perspective view of a connector according to an embodiment.

First, embodiments of the present disclosure are listed and described.

(1) The connector of the present disclosure includes a connector housing, and a flexible cable arranged in the connector housing, the flexible cable including a conductive path, wherein the flexible cable includes a terminal connecting portion to be connected to a mating terminal on one end side of the conductive path and a board connecting portion to be connected to a circuit board on the other end side of the conductive path, and the connector includes a reinforcement plate for reinforcing a region of the flexible cable on the side of the terminal connecting portion. According to this configuration, the board connecting portion can exhibit the flexibility (deformability) of the flexible cable itself. Thus, even if the connector housing and the like are warped and deformed in a reflow process, a state where the board connecting portion is connected to the circuit board can be maintained. On the other hand, since the region on the side of the terminal connecting portion is reinforced by the reinforcement plate, which is a part of the flexible cable, the terminal connecting portion can have strength not to be deformed at the time of connection to the mating terminal. Therefore, it is not necessary to perform an operation of crimping a contact made of metal and the flexible cable and workability at the time of manufacturing is improved.

(2) Preferably, a holding member is provided which holds the flexible cable and is accommodated into the connector housing. According to this configuration, the postures of the terminal connecting portion and the board connecting portion can be corrected by the holding member in advance.

(3) The holding member may include an angle restricting portion for restricting an angle of the board connecting portion with respect to the circuit board. According to this configuration, the board connecting portion can be connected to the circuit board while being set in a proper posture (angle) by the angle restricting portion.

(4) The reinforcement plate may be integrated with the flexible cable, and the holding member may include a position restricting portion for restricting a position of the reinforcement plate. If the position of the reinforcement plate is restricted by the position restricting portion, the position of the terminal connecting portion of the flexible cable is also restricted and, consequently, the terminal connecting portion can be satisfactorily connected to the mating terminal.

(5) The flexible cable may be held by being sandwiched between the connector housing and the holding member. According to this configuration, the flexible cable is held in the housing by a simple configuration. Further, a holding state of the flexible cable and the holding member can be stably maintained.

(6) The terminal connecting portion and the reinforcement plate may be integrated and provided to project toward a tip of the terminal connecting portion, and the connector housing may include a supporting portion for supporting the reinforcement plate from a side opposite to the tip. According to this configuration, when the terminal connecting portion is connected to the mating terminal, a force applied to the reinforcement plate from the mating terminal can be received by the supporting portion and a position shift of the reinforcement plate with respect to the connector housing can be prevented.

(7) A connector mounting body includes the connector of any one of (1) to (6) described above and a circuit board, the board connecting portion being soldered to a surface of the circuit board. According to this configuration, since the board connecting portion can exhibit flexibility, it is possible to provide the connector mounting body having high connection reliability of the board connecting portion and the circuit board.

Details of Embodiment of Present Disclosure

Specific examples of a connector and a connector mounting body of the present disclosure are described below with reference to the drawings. Note that the present invention is not limited to this illustration and is intended to be represented by claims and include all changes in the scope of claims and in the meaning and scope of equivalents.

Figure 2:
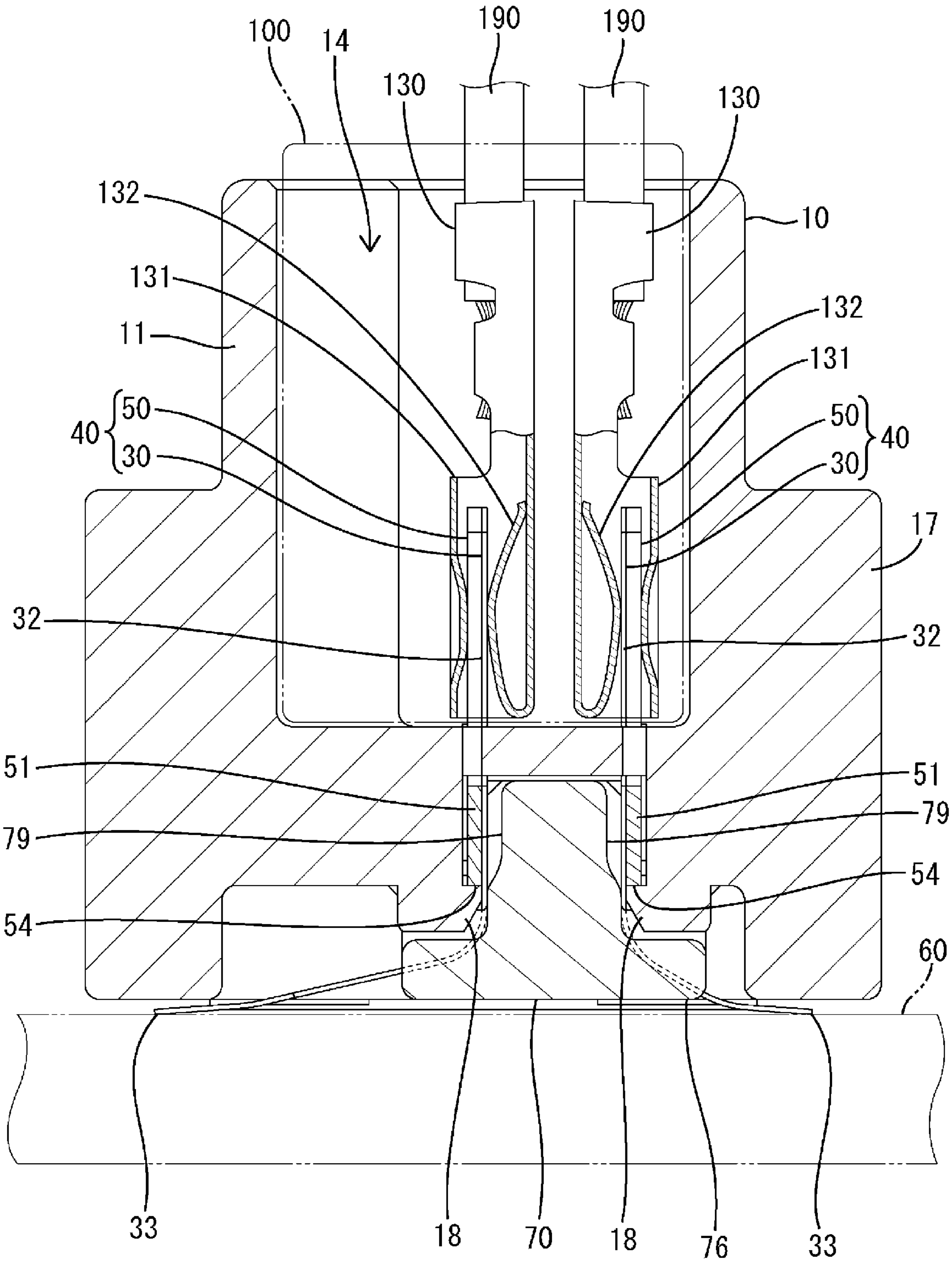
FIG. 2 is a side view in section showing a state where supporting portions are supporting support receiving portions in an intermediate part of a connector housing.
Figure 3:
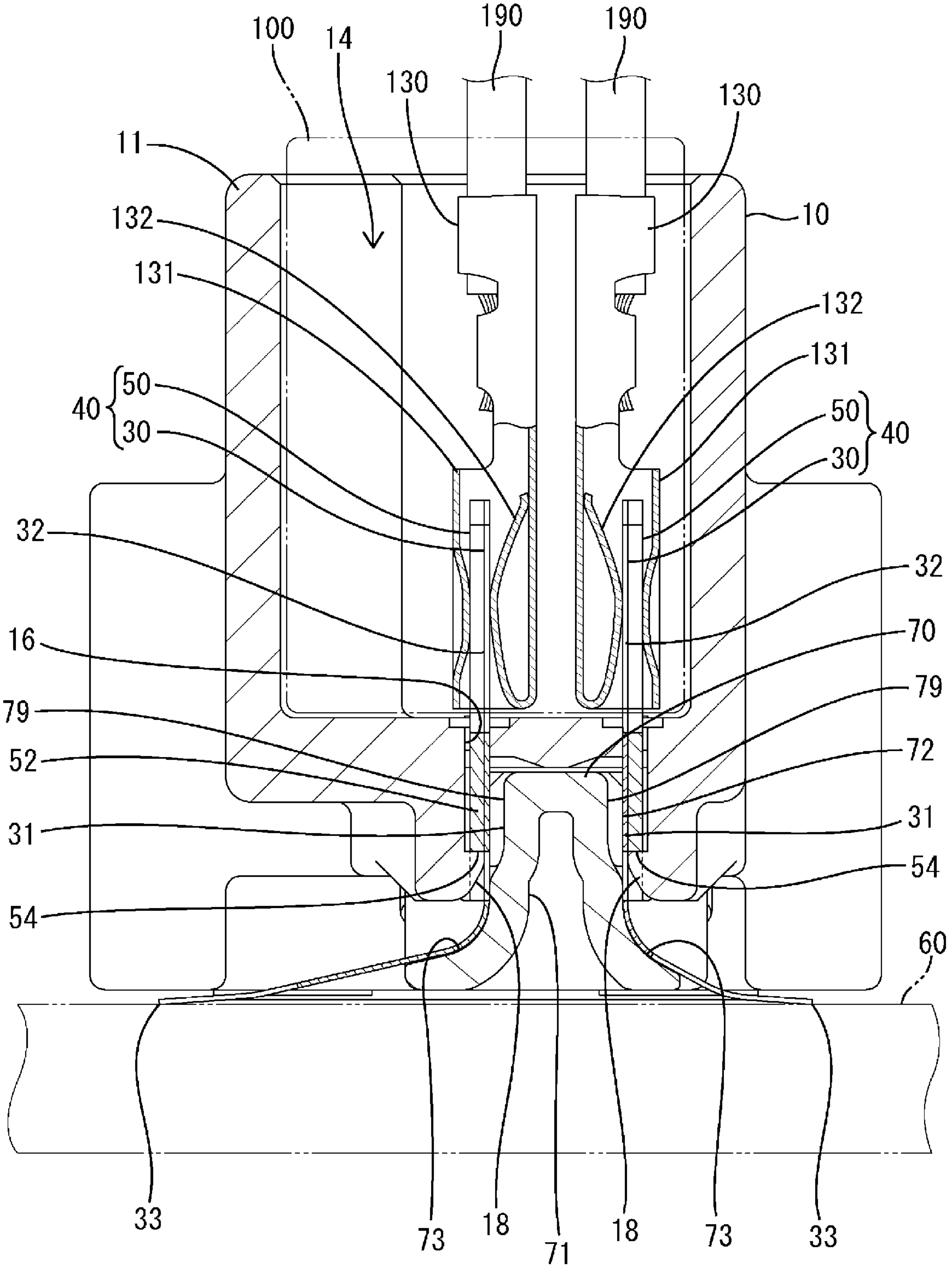
FIG. 3 is a side view in section showing a state where the supporting portions are supporting the support receiving portions in both end parts of the connector housing.

As shown in FIG. 1, a connector according to this embodiment includes fixing members 90, a connector housing 10, flexible cables 30, reinforcement plates 50 and a holding member 70. The flexible cable 30 and the reinforcement plate 50 are integrated with each other to constitute a cable unit 40. As shown in FIGS. 2 and 3, the connector is mounted on a circuit board 60 (rigid printed circuit board) to constitute a connector mounting body together with the circuit board 60.

The connector housing 10 is connected to a mating connector housing 100. The mating connector housing 100 is made of synthetic resin and, although not shown in detail, accommodates a plurality of mating terminals 130 as shown in FIGS. 2 and 3. Each mating terminal 130 is a plate member made of metal and connected to an end part of a wire 190, and includes a tubular box portion 131. The box portion 131 includes a deflectable and deformable resilient contact piece 132 inside.

<Fixing Members 90>

Figure 5:
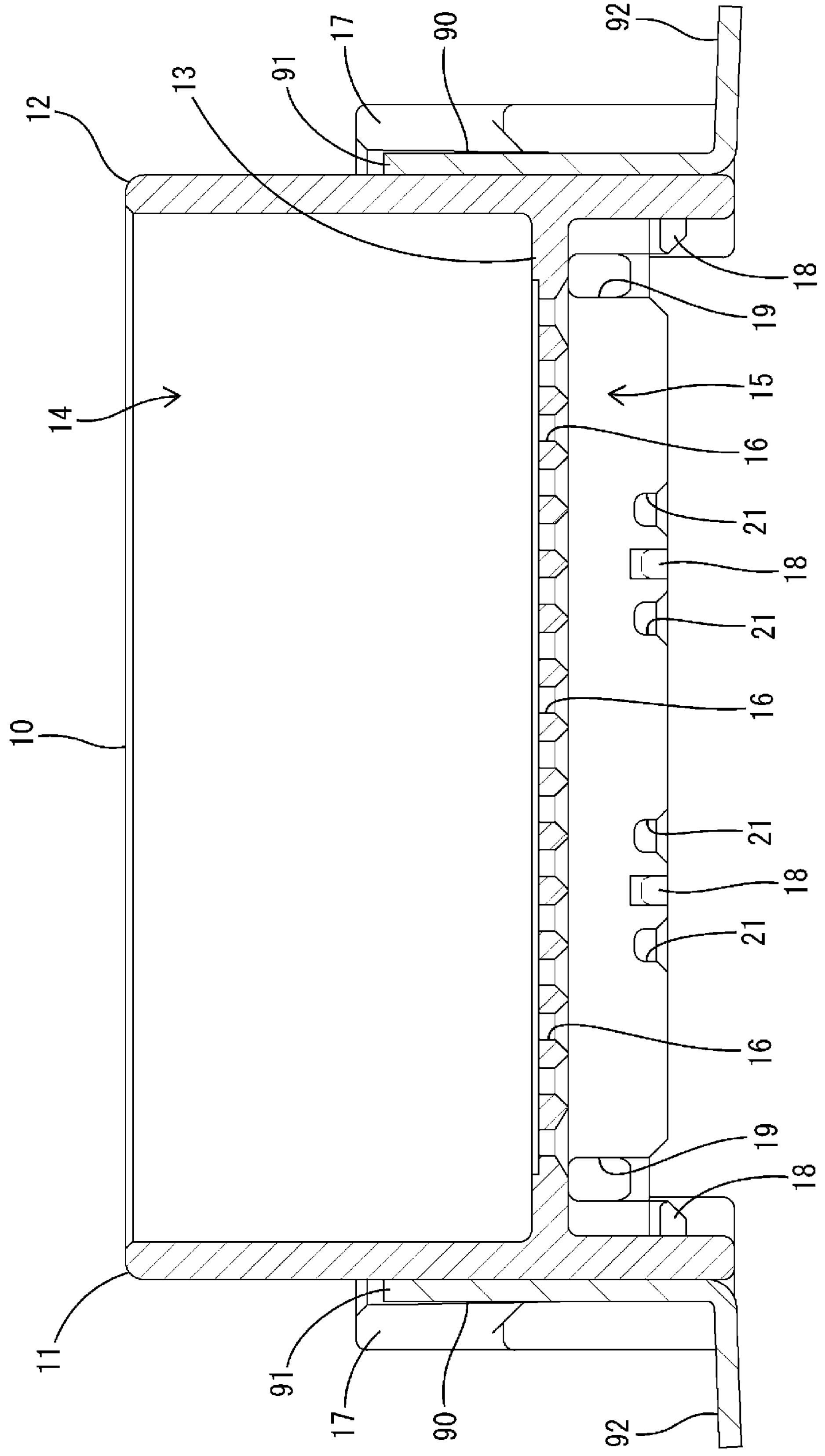
FIG. 5 is a longitudinal section of the connector housing having fixing members mounted thereon.

The fixing member 90 is a flat plate member made of metal, and a pair of the fixing members 90 are provided on both end sides in a width direction of the connector. As shown in FIG. 5, the fixing member 90 has an L-shaped cross-section and includes a first plate portion 91 to be arranged along a vertical direction and a second plate portion 92 to be arranged along the width direction. The first plate portion 91 is mounted on the connector housing 10. The second plate portion 92 is soldered and fixed to the circuit board 60. The connector housing 10 is fixed to the circuit board 60 via the fixing members 90.

<Connector Housing 10>

Figure 4:
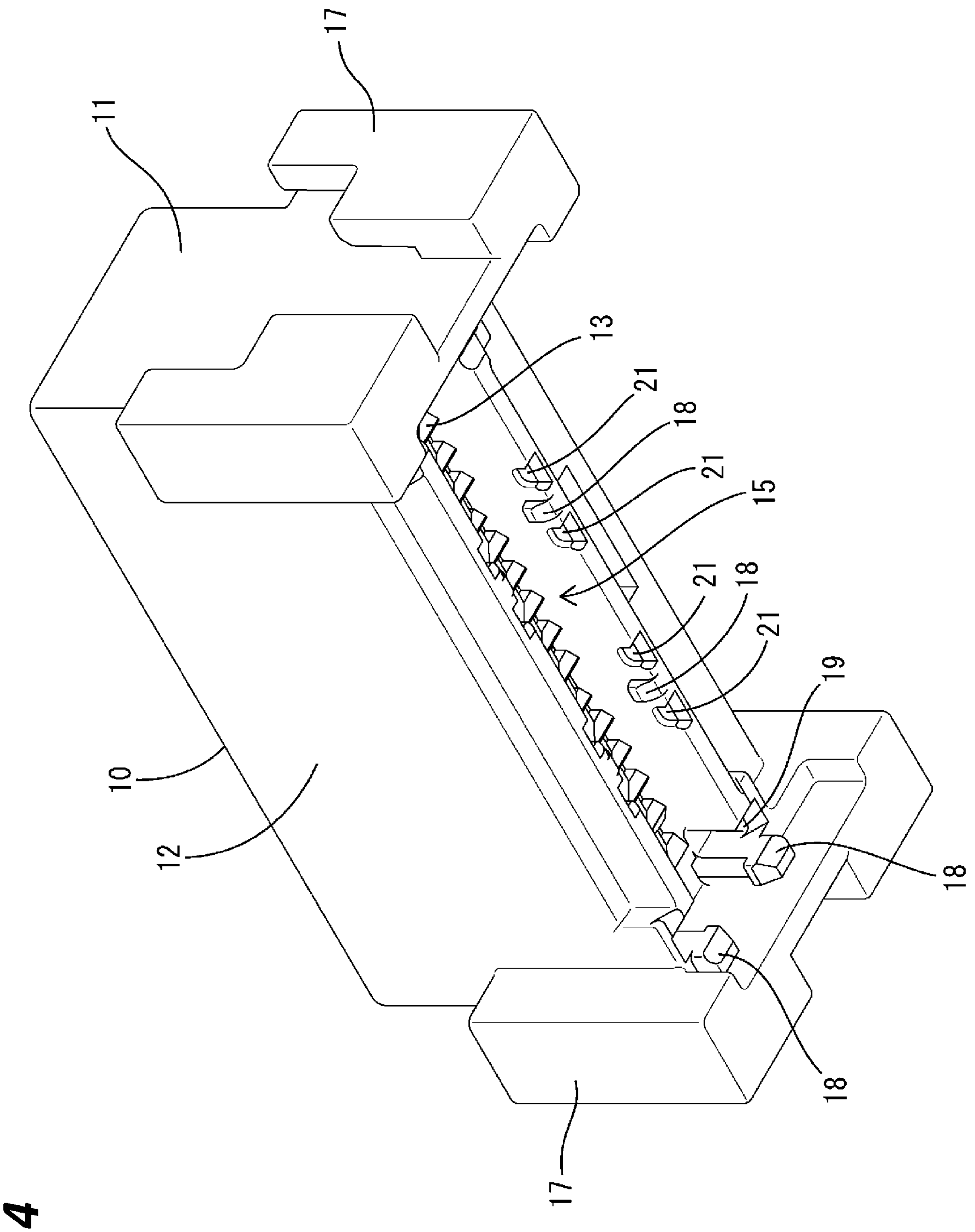
FIG. 4 is a perspective view of the connector housing viewed from below.

The connector housing 10 is made of synthetic resin and includes a receptacle 11 in the form of a rectangular tube long in the width direction as shown in FIGS. 1 and 4. As shown in FIG. 5, the receptacle 11 includes a peripheral wall 12 and a separation wall 13. The peripheral wall 12 includes front and rear walls paired in the front-rear direction and both side walls paired in a lateral direction (width direction), and arranged along the vertical direction. The separation wall 13 is integrally connected to an inner lower part of the peripheral wall 12 and arranged along the width direction. A space above the separation wall 13 in the receptacle 11 serves as a fitting space 14 into which the mating connector housing 100 is inserted. A space below the separation wall 13 in the receptacle 11 serves as an accommodation space 15 into which the holding member 70 is inserted.

The separation wall 13 includes a plurality of insertion holes 16. Each insertion hole 16 penetrates through the separation wall 13 in the vertical direction and a multitude of the insertion holes 16 are arranged in the width direction in two front and rear rows. Later-described terminal connecting portions 32 of the flexible cables 30 are inserted into the respective insertion holes 16 of the separation wall 13.

The peripheral wall 12 includes a pair of mounting portions 17 on both side walls. The mounting portions 17 are shaped to extend forward and rearward in lower parts of the side walls. The first plate portions 91 of the fixing members 90 are held by being inserted into groove parts formed inside the mounting portions 17.

As shown in FIGS. 4 and 5, the peripheral wall 12 includes a plurality of supporting portions 18 on the inner surfaces of the front and rear walls. The respective supporting portions 18 are in the form of claws projecting into the accommodation space 15 and provided at intervals in the width direction on lower ends of the front and rear walls.

The upper surfaces of the respective supporting portions 18 are flatly arranged in the front-rear direction toward the fitting space 14. As shown in FIGS. 2 and 3, the cable units 40 can be supported from below by the respective supporting portions 18.

The respective supporting portions 18 are provided on both widthwise end parts (see FIG. 2) and in intermediate parts (see FIG. 3) on both sides across widthwise centers on the lower ends of the front and rear walls. The respective supporting portions 18 on the both end parts have a larger vertical dimension than the respective supporting portions 18 in the intermediate parts. The upper surfaces of the respective supporting portions 18 of the both end parts are located below those of the respective supporting portions 18 in the intermediate parts. As shown in FIGS. 4 and 5, recesses 19 are provided at positions adjacent to the respective supporting portions 18 of the both end parts in the inner surfaces of the front and rear walls of the peripheral wall 12. Further, recessed parts 21 are provided on both sides across the respective supporting portions 18 in the intermediate parts in the inner surfaces of the front and rear walls. The recesses 19 are shaped to extend in the vertical direction in the inner surfaces of the front and rear walls.

<Flexible Cables 30>

The flexible cable 30 is a cable illustrated as a FFC (Flexible Flat Cable) or a FPC (Flexible Printed Circuits) and has flexibility (deformability) to be easily deformed by receiving an external force.

Figure 6:
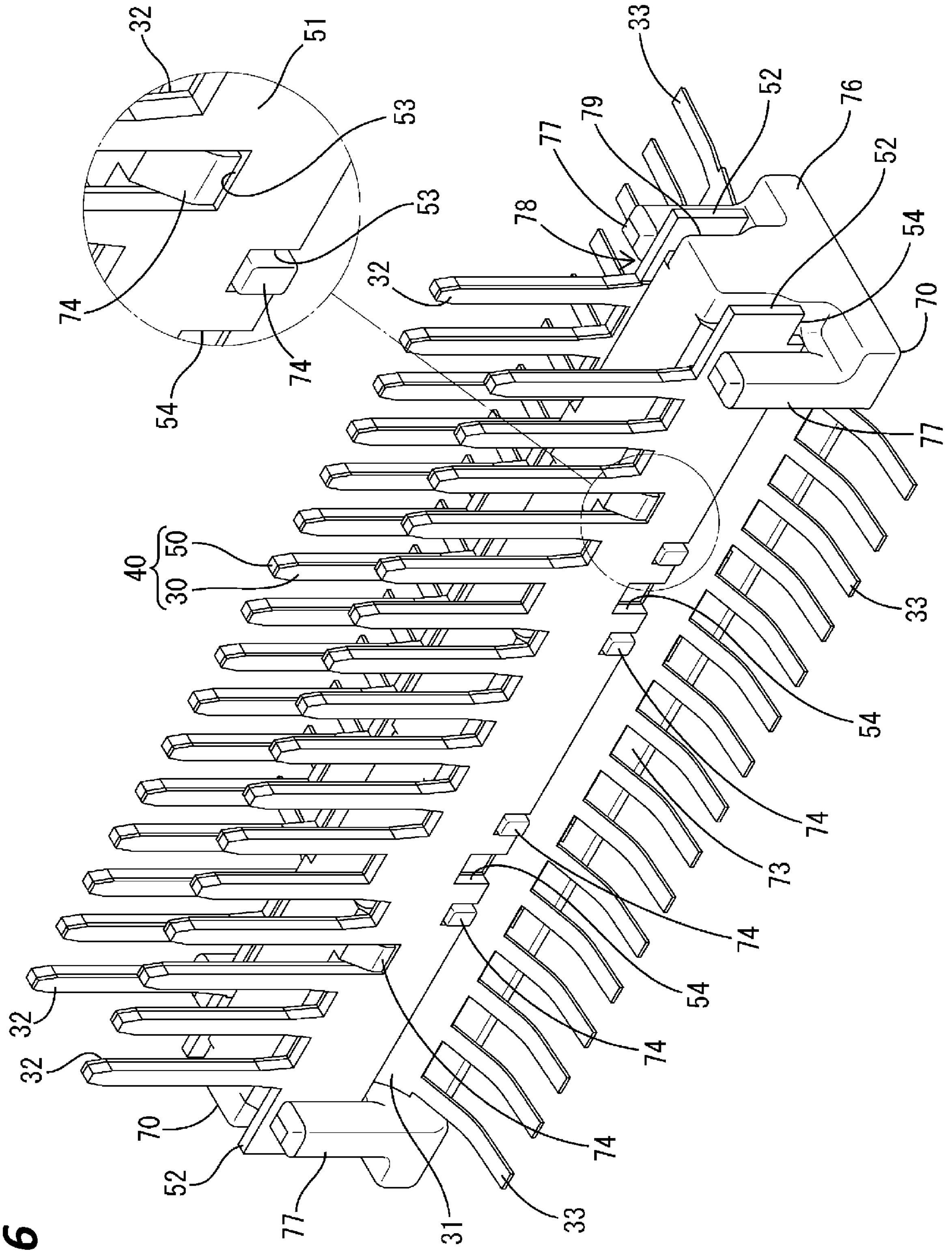
FIG. 6 is a perspective view of cable units viewed from above.

As shown in FIGS. 1 and 6, the flexible cable 30 includes a coupling portion 31 in the form of a rectangular strip extending in the width direction, a plurality of terminal connecting portions 32 projecting upward while being arranged in the width direction on the upper end of the coupling portion 31 and a plurality of board connecting portions 33 projecting downward while being arranged in the width direction on the lower end of the coupling portion 31.

Figure 9:
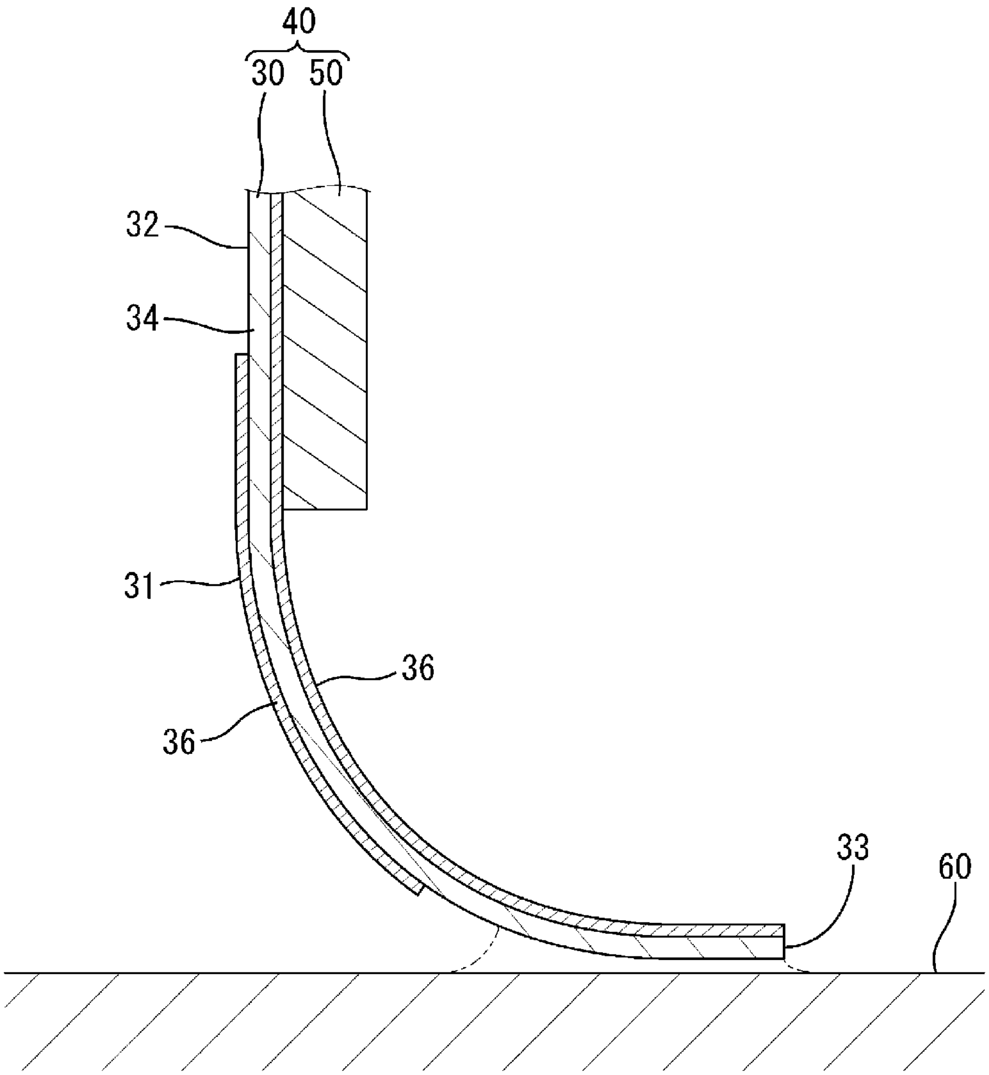
FIG. 9 is a longitudinal section showing a state where a board connecting portion is connected to a circuit board.

Further, the flexible cable 30 includes conductive paths 34 extending in the vertical direction from the respective terminal connecting portions 32 to the respective board connecting portions 33 and a protecting portion 36 configured to cover both surfaces of the respective conductive paths 34 except one surface of each of the terminal connecting portions 32 and the board connecting portions 33 and form the coupling portion 31 extending in the width direction when viewed in a plate thickness direction shown in FIG. 9. Each conductive path 34 is, for example, formed by a copper foil. The protecting portion 36 is formed, for example, by a film or sheet made of synthetic resin. One surface of each of the terminal connecting portions 32 and the board connecting portions 33 is not covered by the protecting portion 36, whereby each conductive path 34 is exposed. Each conductive path 34 is provided in an individually separated state on the one surface of each of the terminal connecting portions 32 and the board connecting portions 32. In this way, the terminal connecting portion 32 is arranged on one end side (upper end side) of the conductive path 34 and the board connecting portion 33 is arranged on the other end side (lower end side) of the conductive path 34.

A pair of front and rear flexible cables 30 are provided in the connector. The respective terminal connecting portions 32 of the front and rear flexible cables 30 are inserted into the respective insertion holes 16 in the front and rear rows.

<Reinforcement Plates 50>

Figure 7:
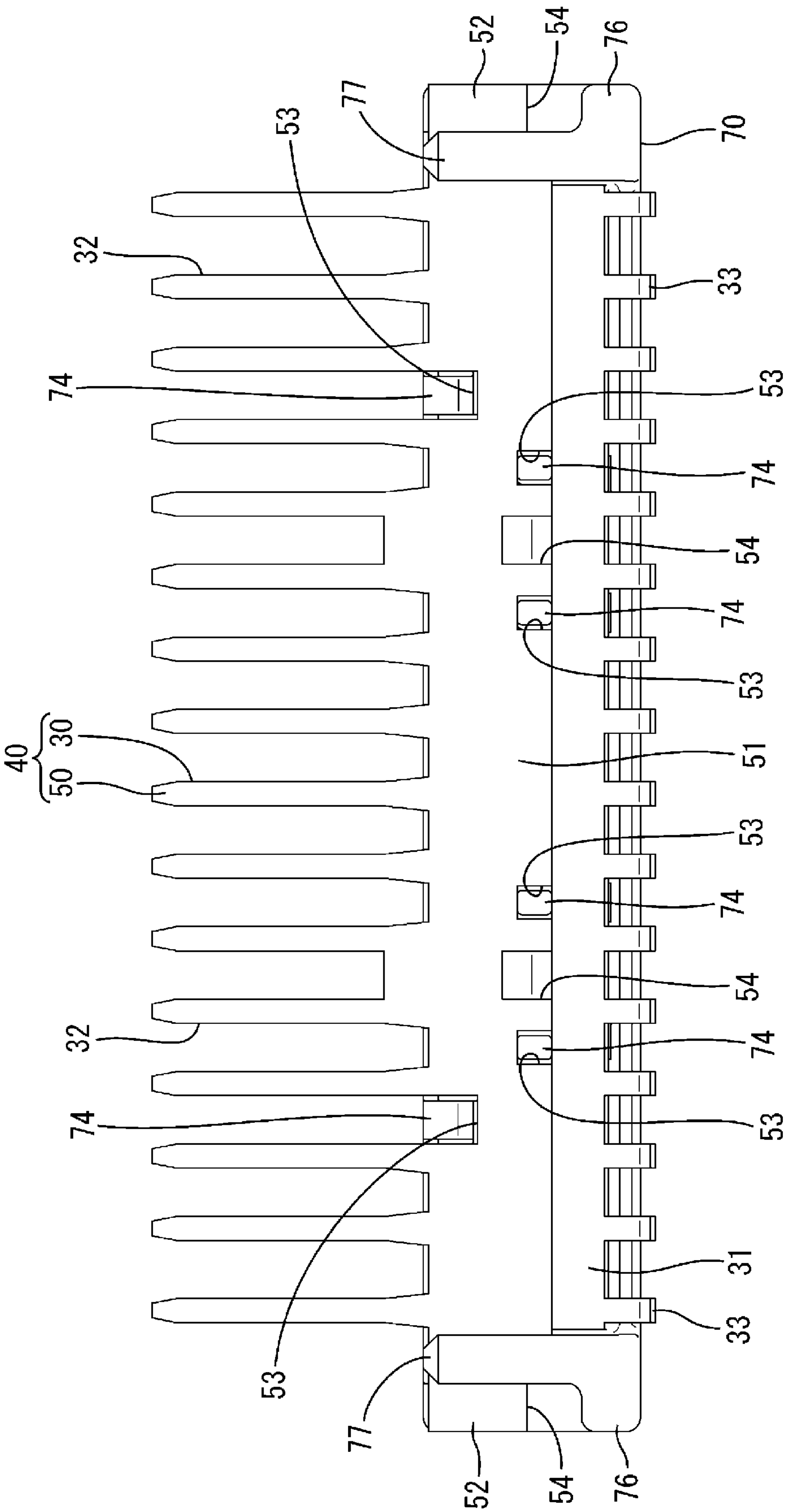
FIG. 7 is a front view of the cable unit.

The reinforcement plate 50 is made of polyimide resin or glass epoxy resin and reinforces a region of the flexible cable 30 on the side of the respective terminal connecting portions 32. As shown in FIGS. 6 and 7, the reinforcement plate 50 is molded into a shape corresponding to an upper part of the coupling portion 31 and the respective terminal connecting portions 32 and provided on the other surface sides (surface sides having the protecting portion 36) of the upper part of the coupling portion 31 and the respective terminal connecting portions 32. For example, the reinforcement plate 50 is bonded to the other surfaces of the upper part of the coupling portion 31 and the respective terminal connecting portions 32 of the flexible cable 30 via an adhesive. The reinforcement plate 50 and the flexible cable 30 are integrated with separation restricted, whereby the cable unit 40 is configured.

As shown in FIGS. 2 and 3, the reinforcement plate 50 is provided on an upper end side of the outer surface (opposite to a surface facing the other flexible cable 30 in the connector) of each flexible cable 30 with the pair of flexible cables 30 arranged on front and rear sides in the connector.

As shown in FIGS. 6 and 7, a part of the reinforcement plate 50 corresponding to the upper part of the coupling portion 31 is configured as a base portion 51 extending in the width direction. The base portion 51 includes protruding portions 52 on both widthwise end parts. The protruding portions 52 are shaped to protrude on both widthwise sides of the coupling portion 31. The base portion 51 has upper and lower edges along the width direction.

The base portion 51 includes a plurality of lock receiving portions 53 on upper and lower edges. As shown in FIG. 7, a pair of the lock receiving portions 53 are provided on both sides across a widthwise center on the upper edge of the base portion 51, and a pair of the lock receiving portions 53 are provided on each of both sides across a widthwise center on the lower edge of the base portion 51. The respective lock receiving portions 53 on the upper edge and the respective lock receiving portions 53 on the lower edge are arranged at different positions in the width direction. The respective lock receiving portions 53 are rectangularly cut into recesses on the upper and lower edges of the base portion 51.

The coupling portion 31 of the flexible cable 30 likewise includes lock receiving portions 53 in parts corresponding to the respective lock receiving portions 53 of the base portion 51. The respective lock receiving portions 53 of the coupling portion 31 are provided by rectangularly cutting the upper edge of the coupling portion 31 between the terminal connecting portions 32 adjacent in the width direction, and are in the form of rectangular openings penetrating in a vertically intermediate part of the coupling portion 31. The respective lock receiving portions 53 of the coupling portion 31 penetrate through the protecting portion 36 at positions separated from the respective conductive paths 34.

As shown in FIGS. 6 and 7, the base portion 51 includes a plurality of support receiving portions 54 on the lower edge. The respective support receiving portions 54 are provided at intervals on both widthwise end parts (protruding portions 52) of the lower edge of the base portion 51 and in intermediate parts on both sides across a widthwise center. The respective support receiving portions 54 of the protruding portions 52 are L-shaped by being rectangularly cut on corner parts of the lower edge of the base portion 51, and open downward and laterally. The respective support receiving portions 54 in the intermediate parts are in the form of recesses rectangularly cut on the lower edge of the base portion 51, and open downward. The respective support receiving portions 54 in the intermediate parts are provided between the lock receiving portions 53 paired in the width direction.

The coupling portion 31 of the flexible cable 30 likewise includes the support receiving portions 54 in parts corresponding to the respective support receiving portions 54 in the intermediate parts. The respective support receiving portions 54 of the coupling portion 31 are in the form of rectangular openings penetrating in the vertically intermediate part of the coupling portion 31. The respective support receiving portions 54 of the coupling portion 31 penetrate through the protecting portion 36 at positions separated from the respective conductive paths 34.

<Holding Member 70>

The holding member 70 is made of synthetic resin and long in the width direction and has a trapezoidal cross-section. As shown in FIG. 3, the holding member 70 includes an opening 71 open downward inside.

The lower end surface of the holding member 70 is arranged in parallel to a surface of the circuit board 60. The upper surface of the holding member 70 is flat and arranged in parallel to the lower surface of the separation wall 13 of the connector housing 10. The front and rear surfaces of the holding member 70, except both end parts in the width direction, are configured as mounting surfaces 72, on which the coupling portions 31 of the cable units 40 are mounted while facing as shown in FIG. 3.

Upper parts of the mounting surfaces 72 of the holding member 70 are arranged along the vertical direction. Lower parts of the mounting surfaces 72 of the holding member 70 serve as angle restricting portions 73 which are in the form of curved surfaces connected to the upper parts and curved to be more separated toward a lower side. As shown in FIGS. 3 and 6, the angle restricting portion 73 supports the upper parts of the respective board connecting portions 33 and the lower part of the coupling portion 31 of the cable unit 40 in a curved state.

Figure 8:
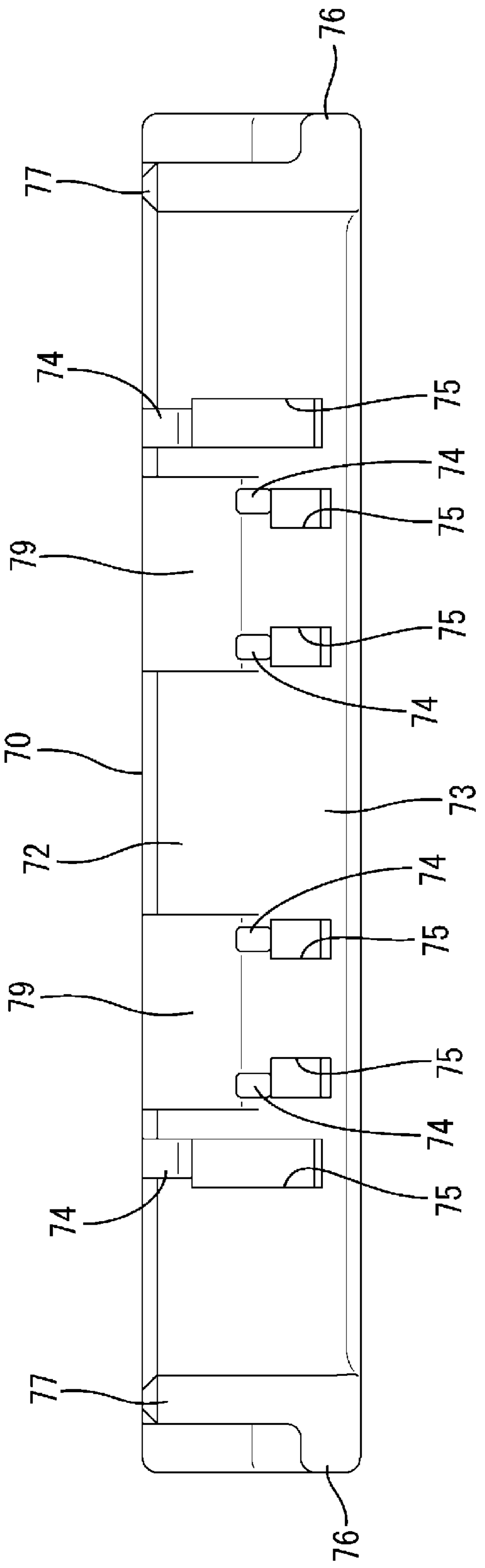
FIG. 8 is a front view of a holding member.

As shown in FIGS. 1 and 8, the holding member 70 includes a plurality of lock portions 74 on the mounting surface 72. A pair of the lock portions 74 are provided on both sides across a widthwise center of the upper end of the mounting surface 72, and a pair of the lock portions 74 are provided on each of both sides across a widthwise center of a vertically intermediate part of the mounting surface 72. The respective lock portions 74 on an upper side and those on a lower side are arranged at positions different in the width direction.

Each lock portion 74 is in the form of a claw projecting on the mounting surface 72 of the holding member 70. Groove portions 75 due to mold removal are open in ranges of downward projection of the respective lock portions 74 in the mounting surface 72 of the holding member 70. As shown in FIG. 6, the respective lock portions 74 are inserted into the respective lock receiving portions 53 to lock the cable unit 40 by vertically sandwiching the cable unit 40.

As shown in FIG. 1, the holding member 70 includes base end portions 76 extending in the front-rear direction on both widthwise end parts and position restricting portions 77 rising upward from front and rear end parts of the respective base end portions 76. Each position restricting portion 77 is in the column having a rectangular cross-section and an insertion space 78 extending in the vertical direction and open upward is defined between each position restricting portion 77 and the front or rear surface. As shown in FIG. 6, the protruding portions 52 of the cable unit 40 are inserted into the insertion spaces 78.

As shown in FIG. 1, the holding member 70 includes escaping portions 79 recessed from adjacent parts on the mounting surface 72. The escaping portions 79 are provided on both widthwise end parts and in intermediate parts on both sides across a widthwise center on the mounting surface 72 of the holding member 70. Parts of the cable unit 40 can be deflected and deformed to enter the escaping portions 79 when interfering with the supporting portions 18 as described later.

<Manufacturing Method of Connector and Connector Mounting Body>

The cable units 40 are mounted on the holding member 70 before being mounted into the connector housing 10. In mounting the cable unit 40, the respective protruding portions 52 are inserted into the respective insertion spaces 78 of the holding member 70 from above. In the process of inserting the cable unit 40, the coupling portion 31 is slid along the mounting surface 72 of the holding member 70. The coupling portion 31 interferes with the respective lock portions 74 of the holding member 70 to be deflected and deformed. When the cable unit 40 is properly inserted, the coupling portion 31 resiliently returns and the respective lock portions 74 of the holding member 70 are fit into the respective lock receiving portions 53 of the cable unit 40 (see FIG. 6). The detachment of the cable unit 40 from the mounting surface 72 of the holding member 70 in a separating direction is prevented by the contact of the respective protruding portions 52 with the respective position restricting portions 77 of the holding member 70.

As described above, the position of the reinforcement plate 50 in the front-rear direction is specified by the respective position restricting portions 77 and the position of the reinforcement plate 50 in the vertical direction is specified by the respective lock portions 74, whereby the reinforcement plate 50 is held positioned on the holding member 70. If the position of the reinforcement plate 50 is restricted with respect to the holding member 70 via the respective position restricting portions 77 and the like, the positions of the respective terminal connecting portions 32 are also restricted. The pair of front and rear cable units 40 are mounted on the holding member 70 to correspond to the respective front and rear mounting surfaces 72.

With the cable unit 40 mounted on the holding member 70, the coupling portion 31, the respective terminal connecting portions 32 and the reinforcement plate 50 are arranged along the vertical direction. The respective terminal connecting portions 32 are aligned at certain intervals in the width direction together with the corresponding parts of the reinforcement plate 50, and arranged to rise upward. The respective board connecting portions 33 are curved and deformed along the angle restricting portion 73 of the holding member 70 together with the lower part (part not reinforced by the reinforcement plate 50) of the coupling portion 31, and inclined and arranged at a predetermined angle with respect to the front-rear direction.

The holding member 70 having the cable units 40 mounted thereon is inserted into the accommodation space 15 of the connector housing 10 from below. In the process of insertion into the accommodation space 15, the cable units 40 interfere with the respective supporting portions 18 of the connector housing 10 and parts of the cable units 40 are deflected and deformed to enter the escaping portions 79. When the holding member 70 is properly inserted, the parts of the cable units 40 resiliently return and the respective supporting portions 18 of the connector housing 10 are fit into the respective support receiving portions 54 of the cable units 40. The upper surfaces of the respective supporting portions 18 are in such a state as to contact the back end surfaces of the respective support receiving portions 54. In this way, the respective supporting portions 18 can support the reinforcement plate 50 of the cable unit 40 from a side (lower side) opposite to the tip sides of the respective terminal connecting portions 32 (see FIGS. 2 and 3).

When the holding member 70 is inserted into the accommodation space 15, the respective position restricting portions 77 are matched and inserted into the respective recesses 19 of the connector housing 10. Further, the tips of the respective support receiving portions 54 are arranged to enter the respective recessed parts 21 of the connector housing 10. Then, the cable units 40 are fixed by being press-fit and sandwiched between the inner surfaces of the accommodation space 15 of the connector housing 10 and the mounting surfaces 72 of the holding member 70.

The upper surface of the holding member 70 is arranged to face the separation wall 13. The respective terminal connecting portions 32 are passed through the respective insertion holes 16 of the separation wall 13 together with the corresponding parts of the reinforcement plates 50 and arranged to project into the fitting space 14 of the receptacle 11. Here, the respective terminal connecting portions 32 have the positions restricted by the respective position restricting portions 77 and are kept in an upright posture along the vertical direction. Thus, the respective terminal connecting portions 32 are smoothly inserted through the respective insertion holes 16.

Subsequently, the connector housing 10 having the cable units 40 and the holding member 70 mounted therein (hereinafter, referred to as the connector) is placed on the surface of the circuit board 60. Here, the respective board connecting portions 33 are not reinforced by the reinforcement plates 50 and have an original easily deformable property of the flexible cables 30. Further, the conductive paths 34 on the one surface sides of the respective board connecting portions 33 are curved downward by the angle restricting portions 73 and an installation angle with respect to the circuit board 60 is adjusted in advance. Thus, the respective board connecting portions 33 are flexibly deflected and deformed along the surface of the circuit board 60 as a load (self-weight) of the connector is applied in the process of installation, and the conductive paths 34 on the one surface sides can smoothly contact the surface of the circuit board 60 (see FIG. 9).

Subsequently, the connector is carried into an unillustrated reflow furnace. In a reflow process, paste solder applied onto the surface of the circuit board 60 is melted and the melted solder is attached to the respective board connecting portions 33. Thereafter, the solder is cooled and solidified. In this way, the board connecting portions 33 are electrically connected to conductive paths on the surface of the circuit board 60. Even if the circuit board 60 and the connector housing 10 are deformed by heat during reflow soldering, the respective board connecting portions 33 can maintain a connected state to the circuit board 60 by the flexibility thereof without lifting up from the surface of the circuit board 60. Further, the second plate portions 92 of the respective fixing members 90 are also fixed to the circuit board 60 by reflow soldering. In the above way, the connector is mounted on the surface of the circuit board 60 to obtain a connector mounting body.

Subsequently, the connector is connected to the mating connector housing 10. The mating connector housing 100 is inserted into the fitting space 14 of the receptacle 11 (see FIGS. 2 and 3). The respective terminal connecting portions 32 enter the box portions 131 of the respective mating terminals 130. Then, the conductive paths 34 on the one surface sides of the respective terminal connecting portions 32 resiliently contact the resilient contact pieces 132 of the respective mating terminals 130. In this way, the respective terminal connecting portions 32 are electrically connected to the respective mating terminals 130. Here, the respective terminal connecting portions 32 are reinforced by the reinforcement plates 50 provided on the other surface sides. As a result, the respective terminal connecting portions 32 can ensure strength against loads from the respective mating terminals 130 and are prevented from being deformed at the time of connection to the respective mating terminals 130. Further, the respective position restricting portions 77 and the respective lock portions 74 restrict the positions of the reinforcement plates 50 with respect to the holding member 70, whereby the respective terminal connecting portions 32 can smoothly enter the box portions 131 of the corresponding mating terminals 130. Therefore, good connection of the terminal connecting portions 32 and the mating terminals 130 can be realized.

When the both connector housings 10, 100 are connected, the flexible cables 30 receive a downward force (connecting force) from the side of the mating connector housing 100. Here, the respective supporting portions 18 of the connector housing 10 contact the back end surfaces of the respective support receiving portions 54, thereby being able to support the reinforcement plates from below against the above force. Therefore, position shifts of the reinforcement plates 50 with respect to the connector housing 10 are prevented.

As described above, according to this embodiment, even if heat is applied in the reflow process, the respective board connecting portions 33 can maintain a state connected to the circuit board 60 by being flexibly deformed. Thus, a state where the respective board connecting portions 33 are located on the surface (plane) of the circuit board 60 can be easily realized. As a result, the connection reliability of the flexible cables 30 and the circuit board 60 can be ensured. On the other hand, since being reinforced by the reinforcement plates 50, the terminal connecting portions 32 have strength not to be deformed at the time of connection to the mating terminals 130.

Further, in the case of this embodiment, the flexible cable 30 and the reinforcement plate 50 are integrated to configure the cable unit 40, and the cable units 40 are assembled with the connector housing 10 while being held on the holding member 70. Since the flexible cables 30 are held on the holding member 70, the postures of the terminal connecting portions 32 and the board connecting portions 33 can be corrected in advance by the holding member 70 before the flexible cables 30 are assembled with the connector housing 10. As a result, an assembling operation with the connector housing 10 can be smoothly and quickly performed.

Further, the respective board connecting portions 33 can be connected to the circuit board 60 while being held in a proper posture (angle) by the angle restricting portions 73. Furthermore, since the flexible cables 30 are held by being sandwiched between the connector housing 10 and the holding member 70, a holding state of the cable units 40 and the holding member 70 can be stably maintained by a simple configuration.

Other Embodiments of Present Disclosure

The embodiment disclosed this time should be considered illustrative in all aspects, rather than restrictive.

Although the reinforcement plate 50 is provided from the respective terminal connecting portions 32 to the upper part of the coupling portion 31 in the case of the above embodiment, the reinforcement plate 50 may be provided only on the respective terminal connecting portions 32 or may be provided from the respective terminal connecting portions 32 to the entire coupling portion 31 as another embodiment. The reinforcement plate 50 may be provided to correspond to a region of the flexible cable 30 on the side of the terminal connecting portions 32.

Although the pair of flexible cables 30 are assembled with the connector housing 10 in the case of the above embodiment, only one or three or more flexible cables may be assembled with the connector housing 10 as another embodiment.

Although the flexible cables 30 are assembled with the connector housing 10 while being held on the holding member 70 in the case of the above embodiment, the flexible cables 30 may be directly assembled with the connector housing 10 without via the holding member 70 as another embodiment.

Although the reinforcement plate 50 and the flexible cable 30 are integrated to configure the cable unit 40 in the case of the above embodiment, the reinforcement plate 50 and the flexible cable 30 may be separably provided as another embodiment.

Although the respective board connecting portions 33 of the flexible cable 30 are connected to the circuit board 60 by reflow soldering in the case of the above embodiment, the respective board connecting portions 33 of the flexible cable 30 may be connected to the circuit board 60 by manual soldering as another embodiment. Here, the deformation of the connector housing 10 and the circuit board 60 is not limited to the case of the reflow process. For example, if the connector mounting body is installed under high heat near a heat source and the connector housing 10 and the circuit board 60 are possibly warped and deformed, the configuration of the present disclosure can be applied.

LIST OF REFERENCE NUMERALS

10 . . . connector housing
11 . . . receptacle
12 . . . peripheral wall
13 . . . separation wall
14 . . . fitting space
15 . . . accommodation space
16 . . . insertion hole
17 . . . mounting portion
18 . . . supporting portion
19 . . . recess
21 . . . recessed part
30 . . . flexible cable
31 . . . coupling portion
32 . . . terminal connecting portion
33 . . . board connecting portion
34 . . . conductive path
36 . . . protecting portion
40 . . . cable unit
50 . . . reinforcement plate
51 . . . base portion
52 . . . protruding portion
53 . . . lock receiving portion
54 . . . support receiving portion
60 . . . circuit board
70 . . . holding member
71 . . . opening
72 . . . mounting surface
73 . . . angle restricting portion
74 . . . lock portion
75 . . . groove
76 . . . base end portion
77 . . . position restricting portion
78 . . . insertion space
79 . . . escaping portion
90 . . . fixing member
91 . . . first plate portion
92 . . . second plate portion
100 . . . mating connector housing
130 . . . mating terminal
131 . . . box portion
132 . . . resilient contact piece
190 . . . wire

What is claimed is:

1. A connector, comprising:
a connector housing; and
a flexible cable arranged in the connector housing, the flexible cable including a conductive path,
wherein:
the flexible cable includes a terminal connecting portion to be connected to a mating terminal by entering a box portion of the mating terminal on one end side of the conductive path, a board connecting portion to be connected to a circuit board on the other end side of the conductive path, and a strip-like coupling portion located between the terminal connecting portion and the board connecting portion,
the connector comprises a reinforcement plate integrated with the flexible cable and configured to reinforce a region of the flexible cable on the side of the terminal connecting portion,
a plurality of the terminal connecting portions are arranged side by side on one side edge of the coupling portion and respectively project toward one side, and
the reinforcement plate is shaped to correspond to each of the plurality of terminal connecting portions.

2. A connector, comprising:
a connector housing; and
a flexible cable arranged in the connector housing, the flexible cable including a conductive path,
wherein:
the flexible cable includes a terminal connecting portion to be connected to a mating terminal on one end side of the conductive path and a board connecting portion to be connected to a circuit board on the other end side of the conductive path,
the connector comprises a reinforcement plate integrated with the flexible cable and configured to reinforce a region of the flexible cable on the side of the terminal connecting portion,
the terminal connecting portion and the reinforcement plate are integrated and provided to project toward a tip of the terminal connecting portion, and
the connector housing includes a supporting portion that supports the reinforcement plate from a side opposite to the tip.

3. The connector of claim 1, comprising a holding member that holds the flexible cable, the holding member being accommodated into the connector housing.

4. The connector of claim 3, wherein the holding member includes an angle restricting portion configured to restrict an angle of the board connecting portion with respect to the circuit board.

5. The connector of claim 3, wherein:
the holding member includes a position restricting portion configured to restrict a position of the reinforcement plate.

6. The connector of claim 3, wherein the flexible cable is held by being sandwiched between the connector housing and the holding member.

7. The connector of claim 3, wherein:

the connector housing includes a fitting space, a mating connector housing being fit into the fitting space, an accommodation space configured to accommodate the holding member and a separation wall separating the fitting space and the accommodation space, the separation wall including a plurality of insertion holes, and a plurality of the terminal connecting portion are respectively arranged to project into the fitting space through the insertion holes together with corresponding parts of the reinforcement plate with the holding member arranged in the accommodation space.

8. The connector of claim 1, wherein a plurality of the board connecting portions are arranged side by side on the other end edge of the coupling portion and respectively project toward the other side.

9. A connector mounting body, comprising:

the connector of claim 1; and a circuit board, the board connecting portion being soldered to a surface of the circuit board.

10. The connector of claim 1, wherein the reinforcement plate is made of polyimide resin or glass epoxy resin.

* * * * *